V. P. McVOY.
HOSE COUPLING.
APPLICATION FILED FEB. 4, 1909.
939,434. Patented Nov. 9, 1909.
FIG. 1.
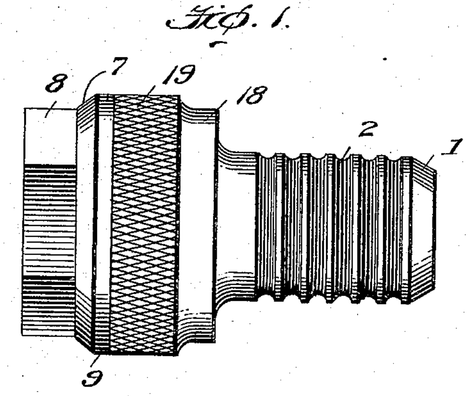
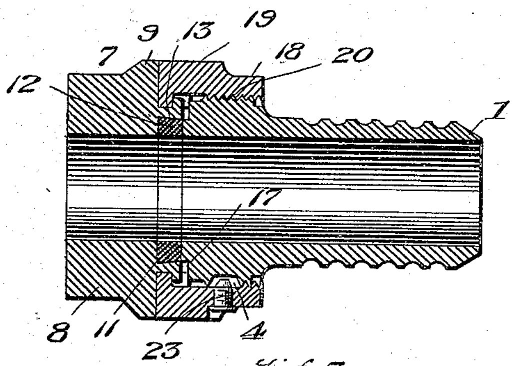
FIG. 2.
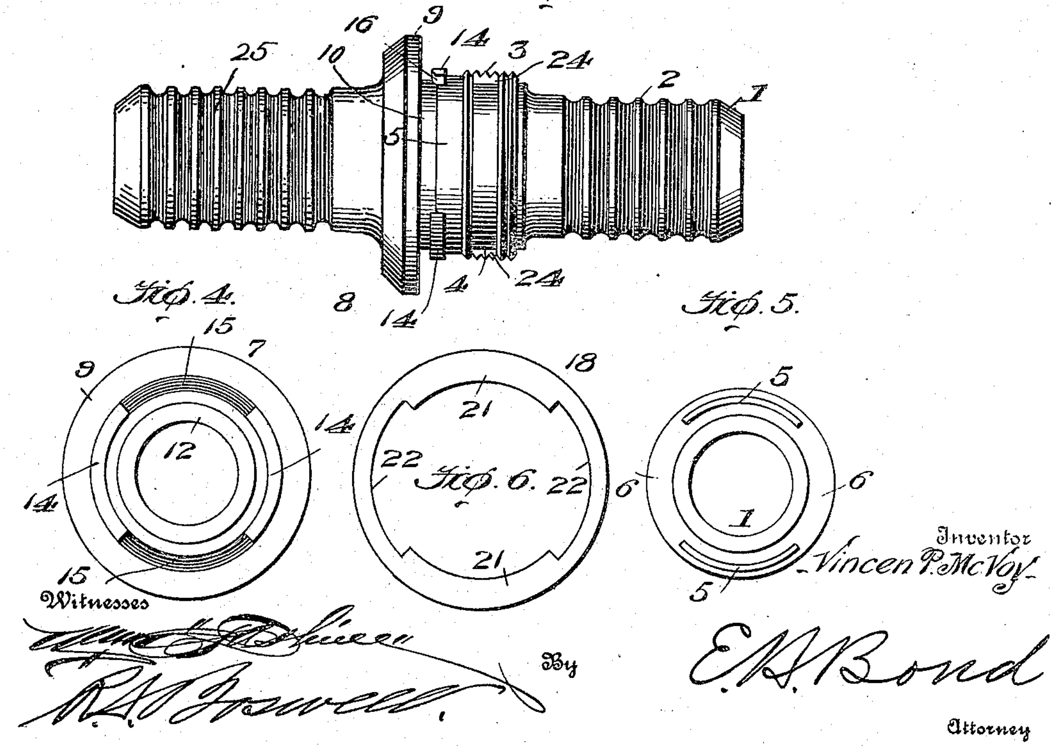
FIG. 3, FIG. 4, FIG. 5, FIG. 6.
Witnesses
[signatures]
Inventor
Vincen P. McVoy
By E. H. Bond
Attorney

UNITED STATES PATENT OFFICE.

VINCEN P. McVOY, OF MOBILE, ALABAMA.

HOSE-COUPLING.

939,434. Specification of Letters Patent. Patented Nov. 9, 1909.

Application filed February 4, 1909. Serial No. 475,959.

*To all whom it may concern:*

Be it known that I, VINCEN P. McVOY, a citizen of the United States of America, and resident of Mobile, in the county of Mobile and State of Alabama, have invented certain new and useful Improvements in Hose-Couplings, of which the following is a specification.

This invention relates to certain new and useful improvements in hose and pipe couplings, designed primarily for use upon small hose such as employed for garden hose and the like.

The present invention pertains more particularly to that class of couplings of this general type in which provision is made for rapid coupling and uncoupling and in which are employed a plurality of lugs on the one member for coöperation with lugs upon the other, and a coupling sleeve engageable over the adjacent ends of the two members.

The present invention has for its objects among others to provide an improved simple, yet durable and efficient coupling of this general nature in which exterior members, such as stop pins and lugs are dispensed with and in which a gasket is employed which is permanently held against accidental displacement within a socket or the like in the end of one member and adapted to have a bearing against the adjacent end of the other member, said gasket being confined within the member and held against outward or lateral movement.

The invention consists further in providing coöperating means on the two members to center them and also to prevent relative rotation of said members so that twisting of the hose is prevented from uncoupling said member. I provide also means for limiting the rotary movement of the coupling sleeve upon the member by which it is carried, said means being concealed within the coupling ring and the groove in which the coöperating member works entirely protected from dust and dirt and all extraneous matters. The other member has a flange which serves to prevent ingress of dirt, dust etc. to the coöperating elements of the two members and also giving to the coupling a neater appearance and furthermore preventing injury to the sleeve.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation of my improved coupling. Fig. 2 is a substantially central longitudinal section through the same. Fig. 3 is an elevation with the coupling sleeve removed showing a slightly modified form. Fig. 4 is an end view of the male member or nut. Fig. 5 is an end view of the other member. Fig. 6 is an end view of the coupling sleeve.

Like numerals of reference indicate like parts throughout the several views.

Referring to the drawings 1 designates a member or section of the coupling, shown in this instance as having its exterior surface screw-threaded or corrugated, as at 2, in the conventional manner, and adapted for engagement within one end of a hose, not shown. The enlarged end of this member is provided with a left-handed screw thread, as shown at 3, and this thread is interrupted at a point extending approximately one-half of the circumference, more or less, as shown at 4, for a purpose which will be hereinafter more fully explained. The enlarged end of this member or section is provided with the oppositely disposed curved ribs or projections 5 which extend substantially a quarter of the circumference of the section, leaving the spaces 6—6 between adjacent ends of said projections or ribs. These projections or ribs, instead of extending laterally beyond the periphery of the section, as has been proposed heretofore, extend in the direction of the length of the member beyond the face end thereof, that is, they are within the circumferential area of the member, as seen clearly in Figs. 2 and 3 and also in Fig. 5.

7 is the opposed member of the coupling. As shown in Figs. 1 and 2, this member comprises or constitutes a nut having a polygonal portion 8 for reception of a wrench or other implement for the purpose of screwing on to pipe connections, and a flange 9, as seen clearly in Figs. 1, 2 and 3. The end of this member is formed with the annular projection 10 of materially less diameter than the flange 9, as shown clearly in Figs. 2 and 3, and in the extreme end thereof is formed an annular socket or groove 11 for the reception of a packing ring or gasket 12, the wall of said groove or socket being undercut, as at 13, for an obvious purpose. As seen clearly in Fig. 2, this packing ring or gasket is held within said socket so as to be there retained at all times and held against accidental displacement when the parts are uncoupled. It may be cemented or otherwise affixed therein, although ordinarily the frictional engagement, aided by the undercut wall, is sufficient to securely retain it in place. This gasket also is held against outward displacement and the pressure of the water upon the inside serves to more tightly compress it or expand it in a manner which will be readily understood. The annular projection 10 is formed with the oppositely disposed lugs or projections 14 which extend substantially each a quarter of the circumference of the member, as is seen best in Fig. 4, leaving the space 15 between the adjacent ends of said lugs or projections, as is also made clear in said Fig. 4. The walls of these spaces are tapered, as seen clearly in Fig. 4, to facilitate centering of the parts when assembling them. The diametrically opposed ends of the projections 14 are rounded up on their inner surface, as seen at 16, to facilitate the application of the opposing flanges of the coupling sleeve.

As seen in Fig. 2, sufficient clearance is left, as is indicated at 17, to prevent the contact of the metal faces of the opposed members of the coupling, so as to insure a perfectly tight joint being provided by the gasket when the parts are drawn together.

18 is the coupling sleeve or ring. It has a milled peripheral portion, as seen at 19, to aid in its being turned, and is provided on its interior with left-handed screw threads 20. At one end it is provided with the oppositely disposed radial lugs or projections 21 which extend for substantially a quarter of the circumference of the ring, leaving the oppositely disposed spaces 22 between adjacent ends of said coupling ring or sleeve.

23 is a screw or the like passed through the rim of the ring and engaging in the groove 4 of the member 1, as seen clearly in Fig. 2, extending a sufficient distance to contact with the shoulders 24 formed at the ends of said groove. It is to be understood that in assembling the parts, the coupling sleeve is screwed upon the threaded end of the member 1 to the required distance before the screw or pin 23 is applied, it being also understood that a partial revolution of the coupling ring or sleeve is all that is necessary to securely clamp the members of the coupling together and insure a water tight joint.

In operation, it being understood that the coupling ring is in position upon the member 1 and free for revolution, limited only by the engagement of the screw or pin 23, with one or the other of the shoulders 24 at the end of the groove 4, and that the sleeve is screwed up to nearly its limit, the coupling is effected as follows. The sleeve is turned left-handed to the stop which will bring the lugs or projections 5 of the member 1 coincident with the lugs 21 of the sleeve or ring. The parts are then in position to receive the lugs 14 of the member 7 in the spaces 6 and 22, when, by a partial revolution of the coupling sleeve or ring, the parts are drawn securely together and held against movement and a perfectly water tight joint provided. When in this position, the parts are held against revolution or partial revolution with respect to each other, by reason of the engagement of the lugs 5 with the ends of the lugs 14, as will be readily understood upon reference to Fig. 3. These lugs 5 are in position not to interfere with the ready assemblage of the parts but in such position as to effectively prevent rotary movement of the parts when coupled.

It is evident that the coupling may be employed for uniting two sections of hose and the manner in which this may be accomplished is indicated at the left of Fig. 2, wherein 25 represents an exteriorly roughened or corrugated member similar to the projecting portion of the member 1.

From the above, it will be seen that I have devised a simple, yet efficient, durable and easily operated coupling capable of manufacture at small cost and in which the ingress of dirt and dust to the operating parts is excluded, and, while the structural embodiment of the invention as herein disclosed is what I at the present time consider preferable, it is evident that the same is subject to changes and variations in details, proportion of parts, etc., and I therefore do not wish to restrict myself to the exact details as hereinbefore described, but reserve the right to make such changes, variations and modifications as come properly within the scope of the protection prayed.

What I claim as new is:—

1. In a hose coupling, a section having external left-handed threads and oppositely disposed projections at the end within the circumference and extending in a direction of the length of the section, a coöperating section having an annular projection with oppositely disposed lugs at the extreme outer end of said projection with an annular space between the same and the adjacent shoulder to receive the projections of the first-named section, and an annular socket, a gasket in said socket, the spaces between said lugs being tapered, clearance being left between the opposed metal faces of the two sections, and a coupling ring mounted upon the first-named section for limited rotation.

2. In a hose coupling, a section having external left-handed threads and oppositely disposed projections at the end within the circumference and extending in the direction of the length of the section, a coöperating section having an annular projection with oppositely disposed lugs at the extreme outer end of said projection with an annular space between the same and the adjacent shoulder to receive the projections of the first-named section, diametrically disposed ends of which are rounded at their starting point and an annular socket with undercut wall, the spaces between said lugs being tapered, a gasket in said socket, clearance being left between the opposed metal faces of the two sections and a coupling ring mounted upon the first-named section for limited rotation.

Signed by me at Washington, D. C., this 2d day of February, 1909.

VINCEN P. McVOY.

Witnesses:
E. H. Bond,
M. A. Bond.